US011557918B2

(12) United States Patent
Mortun

(10) Patent No.: US 11,557,918 B2
(45) Date of Patent: Jan. 17, 2023

(54) RECEPTACLE INDUCTIVE CHARGING DEVICES

(71) Applicant: Hubbell Incorporated, Shelton, CT (US)

(72) Inventor: Sorin Mortun, Irvington, NY (US)

(73) Assignee: Hubbell Incorporated, Shelton, CT (US)

( * ) Notice: Subject to any disclaimer, the term of this patent is extended or adjusted under 35 U.S.C. 154(b) by 914 days.

(21) Appl. No.: 15/944,130

(22) Filed: Apr. 3, 2018

(65) Prior Publication Data

US 2018/0287425 A1 Oct. 4, 2018

Related U.S. Application Data

(60) Provisional application No. 62/481,382, filed on Apr. 4, 2017.

(51) Int. Cl.
*H02J 50/10* (2016.01)
*H02J 50/90* (2016.01)
*H02J 50/40* (2016.01)
*H02J 7/00* (2006.01)

(52) U.S. Cl.
CPC ............ *H02J 50/10* (2016.02); *H02J 7/0042* (2013.01); *H02J 7/0044* (2013.01); *H02J 50/90* (2016.02); *H02J 50/40* (2016.02)

(58) Field of Classification Search
CPC .......... H02J 50/10; H02J 7/0042; H02J 7/025; H02J 7/0044; H02J 50/90; H02J 50/40; H02J 5/005
USPC ......................................................... 320/108
See application file for complete search history.

(56) References Cited

U.S. PATENT DOCUMENTS

| 4,872,087 | A  | * | 10/1989 | Brant ................. H01R 13/7135 361/45 |
| 8,456,131 | B2 | * | 6/2013  | Bukow ................ H02J 7/0044 320/113 |
| 8,575,887 | B1 | * | 11/2013 | Pomare ................ H02J 7/0044 136/291 |
| 9,226,414 | B2 | * | 12/2015 | Weeks ................... H02G 3/081 |
| 9,490,649 | B2 | * | 11/2016 | Moore ..................... H02J 50/12 |
| 2008/0157715 | A1 | * | 7/2008 | Rosenboom .......... H02J 7/0044 320/108 |
| 2012/0139484 | A1 | * | 6/2012 | Gunderman .......... H02J 7/0044 320/108 |
| 2012/0318941 | A1 | * | 12/2012 | Gourley .................... H02J 5/00 248/205.1 |
| 2015/0188356 | A1 | * | 7/2015 | Chen ....................... H02J 7/025 320/108 |

(Continued)

OTHER PUBLICATIONS

PCT/US2018/025853 International Search Report and Written Opinion dated Jun. 20, 2018 (13 pages).

*Primary Examiner* — Richard V Muralidar
(74) *Attorney, Agent, or Firm* — Michael Best & Friedrich LLP

(57) ABSTRACT

A wall outlet inductive charger includes a base connected to a set of terminals for receiving power supply conductors. A faceplate is connected to the base. The faceplate includes a charging portion. A device support extends from the faceplate. A charger housing is connected to the base and positioned between the base and the faceplate. A charging pad including an inductive coil is positioned in the charger housing.

20 Claims, 15 Drawing Sheets

(56) References Cited

U.S. PATENT DOCUMENTS

2017/0025886 A1\* 1/2017 Rohmer ............... H02J 7/0044
2018/0109141 A1 4/2018 Makwinski et al.

\* cited by examiner

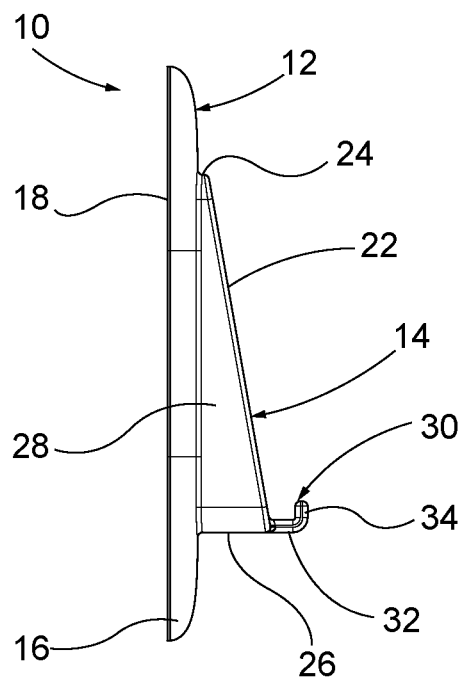
FIG. 3
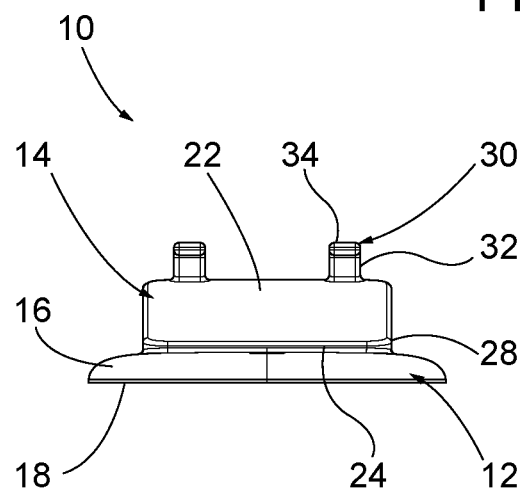 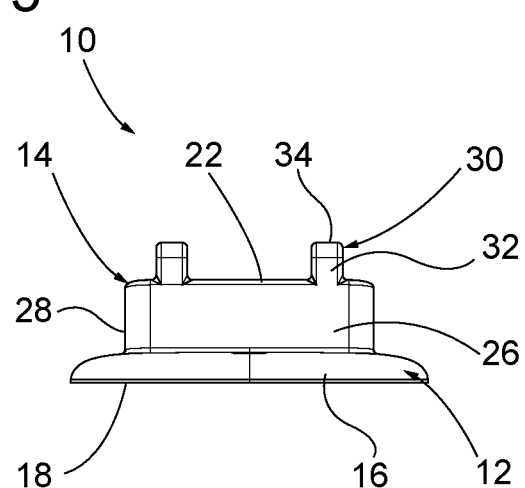
FIG. 4 · FIG. 5

United States Patent US 11,557,918 B2

RECEPTACLE INDUCTIVE CHARGING DEVICES

RELATED APPLICATION(S)

This application is based on U.S. Provisional Application Ser. No. 62/481,382, filed Apr. 4, 2017, the disclosure of which is incorporated herein by reference in its entirety and to which priority is claimed.

FIELD

Various exemplary embodiments relate to indoor outlets for inductive charging electronic devices.

BACKGROUND

Electrical outlet boxes that house power and/or data receptacles are well-known in the industry. Such boxes can stand alone or be recessed within any of a wall, the floor or the ceiling of a room. Conventional electrical outlets have a housing that is connected to a recessed junction box. The housing can include a separate front and back covers that are connected by screws. A mounting strap with flanges at opposite ends generally extends between the front and back covers and allows the housing to be attached to a suitable structure, such as a building wall or a junction box. In some electrical receptacle designs, the mounting strap has a generally U-shape so as to wrap around portions of the front and back covers of the housing. In other electrical receptacle designs, the mounting strap is a relatively flat shape and is disposed between the front and back covers of the housing.

Typical wall outlets provide power to electronic devices using a power socket connected to a main power supply. In the United States, standard wall outlets generally provide power via a two or three pronged socket or other alternative socket such as a universal serial bus (USB) port. Portable devices, such as cell phones, tablets, music players, and other personal electronic devices are being configured to be charged not only by typical male/female connectors, but through wireless inductive charging.

SUMMARY

According to an exemplary embodiment, a wall outlet inductive charger includes a base connected to a set of terminals for receiving power supply conductors. A faceplate is connected to the base. The faceplate includes a charging portion. A device support extends from the faceplate. A charger housing is connected to the base and positioned between the base and the faceplate. A charging pad including an inductive coil is positioned in the charger housing.

According to an exemplary embodiment, a wall outlet inductive charger includes a mounting bracket configured to connect to an outlet housing. A base is connected to the mounting bracket and to a set of terminals for receiving power supply conductors. A faceplate is connected to the base. The faceplate includes a charging portion. A device support is connected to the faceplate. A charger housing is connected to the base and positioned between the base and the faceplate. A charging pad includes an inductive coil positioned in the charger housing.

According to an exemplary embodiment, a wall outlet inductive charger includes a base configured to connect to an outlet housing and a set of terminals for receiving power supply conductors. The base includes a receptacle receiving portion and an inductive charger portion. A faceplate is connected to the base. The faceplate includes a charging portion and a receptacle opening. A device support is connected to the faceplate. A charger housing is connected to the base and positioned between the base and the faceplate. A charging pad includes an inductive coil and is positioned in the charger housing.

BRIEF DESCRIPTION OF THE DRAWINGS

The aspects and features of various exemplary embodiments will be more apparent from the description of those exemplary embodiments taken with reference to the accompanying drawings, in which:

FIG. 3 is side view of FIG. 1;
FIG. 4 is a top view of FIG. 1;
FIG. 5 is a bottom view of FIG. 1.

DETAILED DESCRIPTION OF EXEMPLARY EMBODIMENTS

Figure 1:
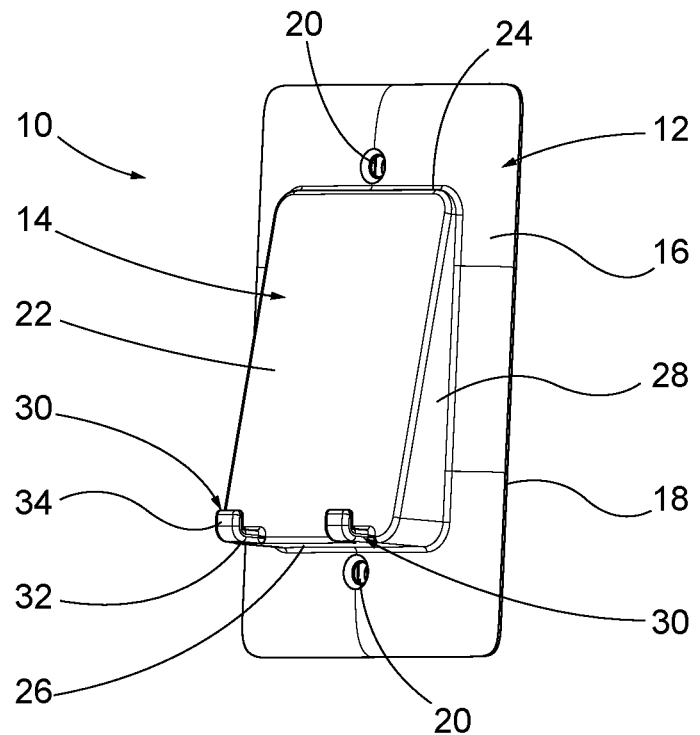
FIG. 1 is a perspective view of an exemplary receptacle inductive charger.

Various exemplary embodiments are directed to inductive charging devices that can be connected to or incorporated with typical power receptacles. FIGS. 1-5 show an exemplary embodiment of an inductive charger that is configured to connect to a standard receptacle opening. The charger includes a wall plate 10 having an outer flange 12 surrounding a charging portion 14. The charger is sized to fit a standard single-gang outlet opening, however it can be modified to be incorporated with a larger outlet configurations, such as a two, four, or six-gang configuration.

The outer flange 12 has a front surface 16 facing a room or other interior environment and an interior surface (not shown) facing a structural component such as a wall. A rear edge 18 of the outer flange 12 is configured to engage the structural component, and the interior portions of the outer flange 12 can be raised or otherwise spaced from the rear edge 18 to provide additional room behind the wall plate 10 for components and electrical connections. The outer flange 12 can include curved surface features to provide a low-profile look, although other shapes and configurations can be used. Top and bottom openings 20 extend through the outer flange 12. Fasteners can be inserted into the openings 20 to connect the wall plate 10 to a receptacle opening or junction box. Other connection features can be used, include snap-fit features.

The charging portion 14 is positioned substantially in the center of the wall plate 10 and includes a pad 22 having a charging surface. The pad 22 is spaced from the outer flange 12 by an outer wall having a top portion 24, a bottom portion 26, and a pair of side portions 28. The corners of the outer wall can be curved. According to an exemplary embodiment, the bottom wall 26 has a height that is greater than the height of the top wall 24 and the side walls 28 have a variable height between the top wall 24 and the bottom wall 26 as best shown in FIGS. 3-5. This results in a lower portion of the pad 22 extending from the outer flange 12 a greater distance than the upper portion of the pad 22, giving the charging portion 14 an angled configuration.

According to various exemplary embodiments, the charging portion 14 is configured to be collapsible or otherwise moveable so that it has a lower profile when not in use. The charging pad 22 and one or more portions of the outer wall can include telescopic or accordion features that allow the charging portion 14 to be moved toward and away from the outer flange 12. The charging portion 14 can be pivoted about the upper wall 24 or a point substantially near the upper wall 24 to pivot the bottom portion of the charging pad 22 relative to the outer flange.

Figure 2:
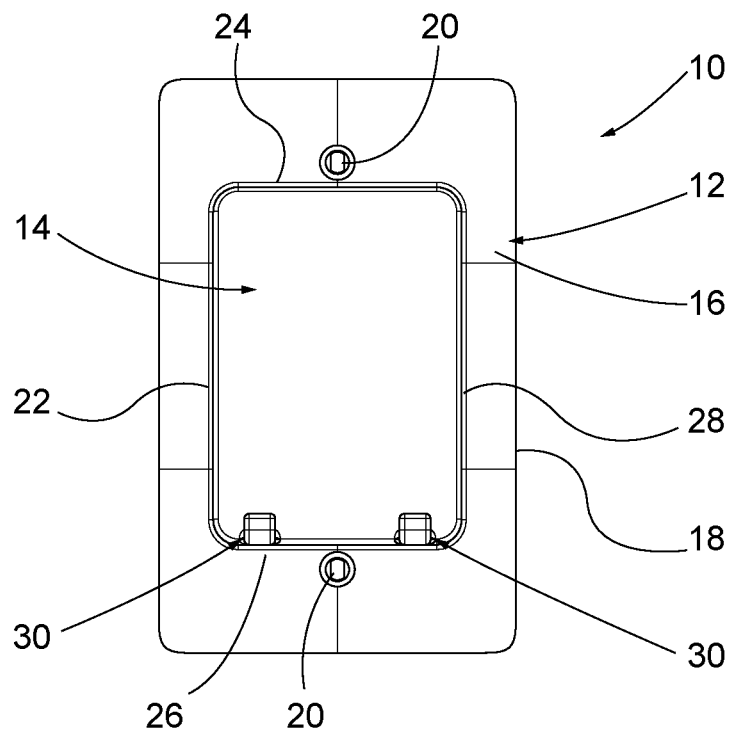
FIG. 2 is a front view of FIG. 1.
Figure 6:
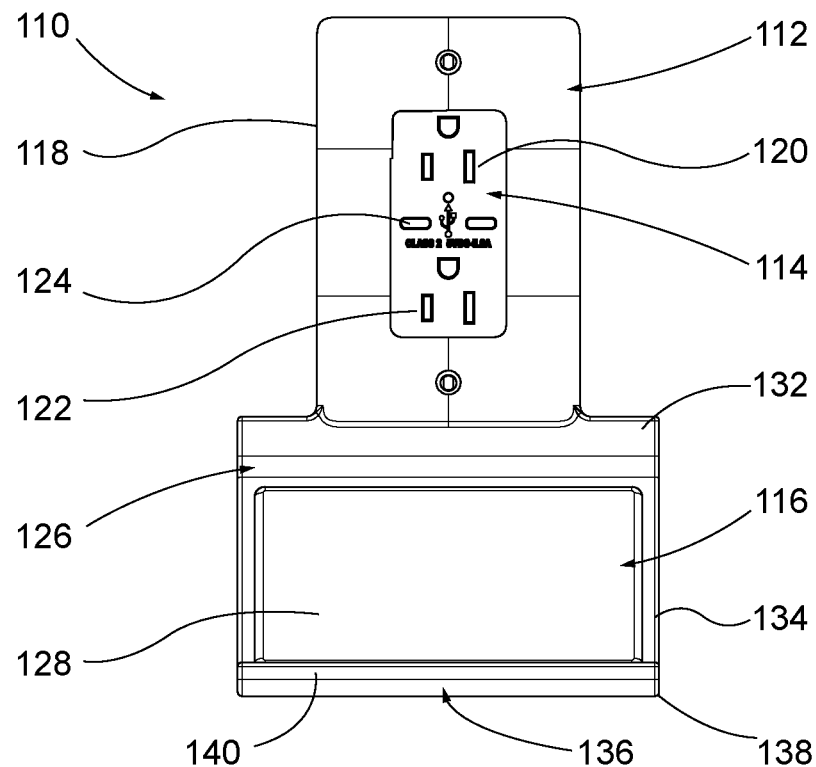
FIG. 6 is a front view of an exemplary combination outlet and inductive charger.

The charging portion 14 also includes at least one retaining member. In the illustrated embodiment, the retaining member includes a pair of hooks 30 extending from the bottom of the charging portion. The first and second hook members 30 are spaced form one another and also spaced from the outer side edges of the charging pad 22 as best shown in FIG. 2. Each of the hooks 30 includes a bottom section 32 extending away from the charging pad 22 and a front section 34 extending up from the bottom section as best shown in FIG. 3. In this embodiment the bottom section 32 and the front section 34 of the hook 30 are substantially perpendicular to one another and also include a curved transition. Other sizes, shapes, and configurations can also be used. Although this embodiment depicts two discreet retaining members, a single retaining member can be used extending along any length of the charging pad 22. Additional retaining members can also be incorporated into the inductive charger.

The charging portion 14 is configured to receive a portable electronic device, for example a smart phone. The electronic device can be positioned on the charging pad 22 and the retaining members and angled pad surface help secure the electronic device to the charger. The charging pad 22 can also have one or more surface features that helps retain or secure an electronic device to the charger. For example, the charging pad 22 can include a semi-adhesive or tacky surface material, such as a polyethylene film with an acrylic adhesive. Other suitable materials can also be used. Other surface features, for example friction enhancing surface features can also be used.

The charging portion 14 is configured to provide wireless, inductive charging to an electronic device. One or more inductive coils (not shown) can be positioned inside of the charging portion 14, for example positioned behind the charging surface. The coils can be positioned inside a wall of the charging pad 22 or connected to the rear of the charging pad 22. One or more electrical connectors are operatively connected to the coils to provide power from a mains power supply to the coils.

FIGS. 6-11 show an exemplary embodiment of a combination outlet and inductive charger. The combination device includes a wall plate no having an outer flange 112 surrounding a receptacle portion 114 and an inductive charging member 116 extending from the outer flange 112. The combination device is sized to fit a standard single-gang outlet opening, however it can be modified to be incorporated with a larger outlet configurations, such as a two, four, or six-gang configuration.

The outer flange 112 has a front surface facing a room and an interior surface facing a structural component such as a wall. A rear edge 118 of the outer flange 112 is configured to engage the structural component, and the interior portions of the outer flange 112 can be raised or otherwise spaced from the rear edge 118 to provide additional room behind the wall plate for components and electrical connections. The outer flange 112 can include curved surface features to provide a low-profile look, although other shapes and configurations can be used. Top and bottom openings 120 extend through the outer flange 112. Fasteners can be inserted into the openings to connect the wall plate to a receptacle opening or junction box. Other connection features can be used, include snap-fit features.

The receptacle portion 114 is positioned substantially in the center of the outer flange 112 and includes a top three-prong outlet 120, a bottom three prong outlet 122, and a pair of USB outlets 124. Different outlet configurations can also be used, including two prong outlets or only USB outlets.

Figure 7:
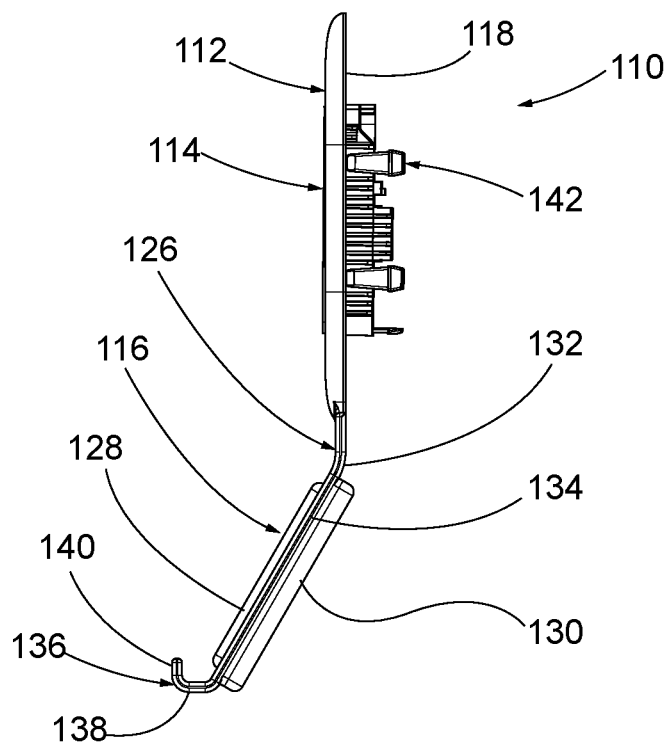
FIG. 7 is a side view of FIG. 6.
Figure 8:
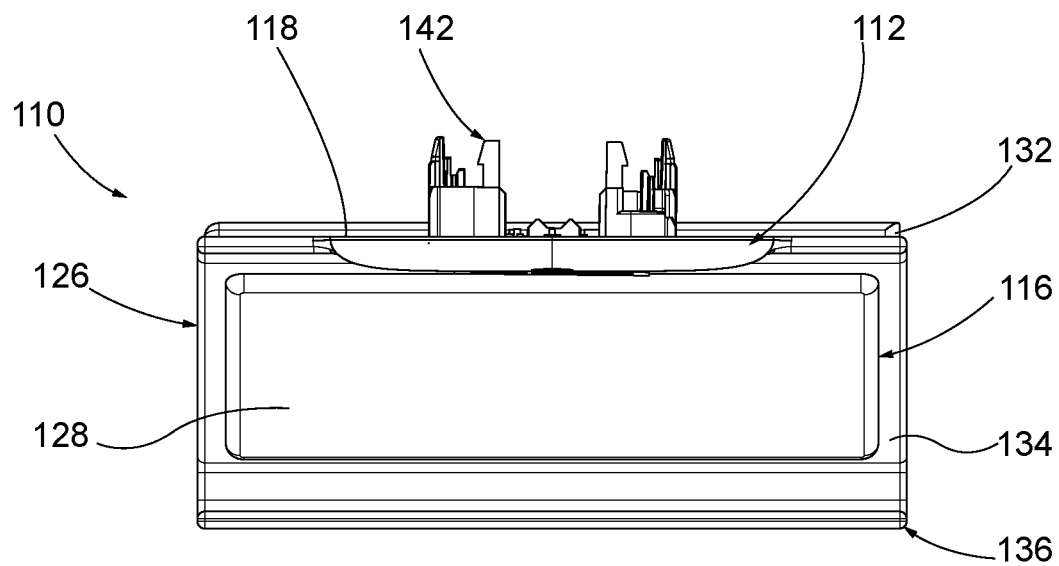
FIG. 8 is a top view of FIG. 6.
Figure 9:
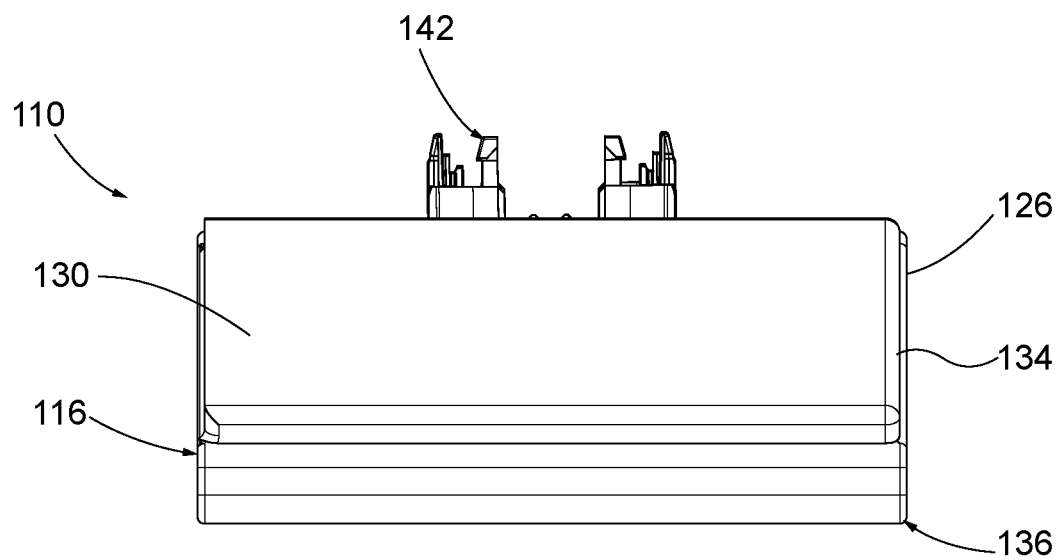
FIG. 9 is a bottom view of FIG. 6.

The charging portion 116 extends from the bottom of the outer flange 112 and includes a support 126 connected to the outer flange 112, a charging pad 128 extending from the front of the support 126 and a charger housing 130 extending from the rear of the support 126. The support 126 has a first portion 132 extending below the outer flange 112 and a second portion 134 that extends at an angle below and away from the first portion 132 at an oblique angle away from the wall or other support surface. This results in a lower portion of the pad 128 extending from the outer flange 112 a greater distance than the upper portion of the pad 128, giving the charging portion 116 an angled configuration as best shown in FIG. 7. In alternative embodiments, the charging portion 116 can also be configured to extend from the top or sides of the outer flange 112.

According to various exemplary embodiments, the charging portion 116 is configured to be moveable so that it has a lower profile when not in use. For example the support member can be pivotable from the position shown in FIG. 7 to a collapsed position where the second portion 134 of the support member 126 is substantially vertically aligned with the first portion 132 or further toward the support surface. The support member 126 can include a hinge, for example a living hinge, to allow for pivotal movement. The support member 126 can also be configured to rotate in the opposite direction further than what is shown in FIG. 7.

The charging portion 116 also includes at least one retaining member. In the illustrated embodiment, the retaining member includes a single hook 136 extending from, and along the length of, the bottom of the charging portion 116. The hook 136 includes a bottom section 138 extending away from the charging pad 128 and a front section 140 extending up from the bottom section 138 as best shown in FIG. 7. In this embodiment the bottom section 138 and the front section 140 of the hook are substantially perpendicular to one another and also include a curved transition. Multiple retaining members and other sizes, shapes, and configurations can also be used. Additional retaining members can also be incorporated into the inductive charger.

The charging portion 116 is configured to receive a portable electronic device, for example a smart phone. The electronic device can be positioned on the charging pad 128 and the retaining member and angled pad help secure the electronic device to the charger. The charging pad 128 can also have one or more surface features that helps retain or secure an electronic device to the charger. For example, the charging pad 128 can have a semi-adhesive or tacky surface material. For example the charging pad 128 can include a polyethylene film with an acrylic adhesive. Other suitable material can also be used. Other surface features, for example friction enhancing surface features can also be used.

Figure 10:
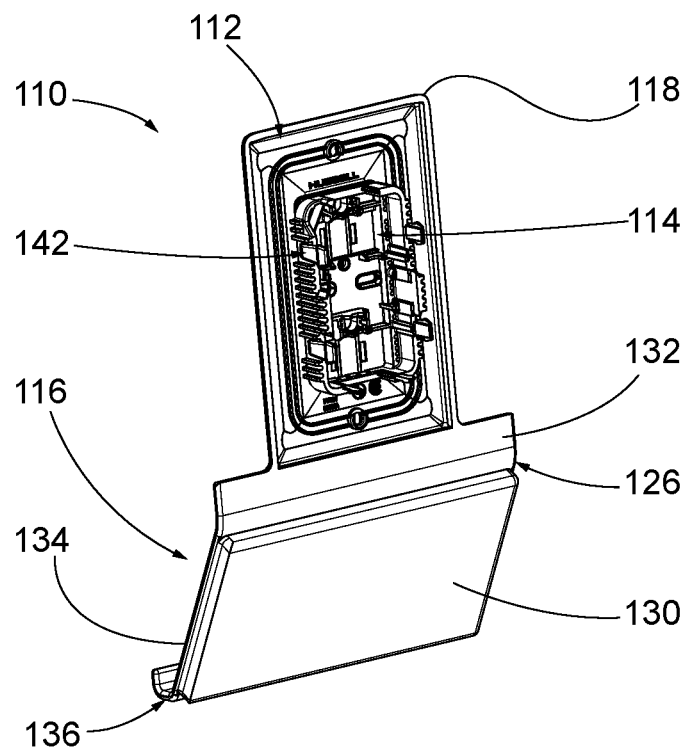
FIG. 10 is a rear perspective view of FIG. 6.
Figure 11:
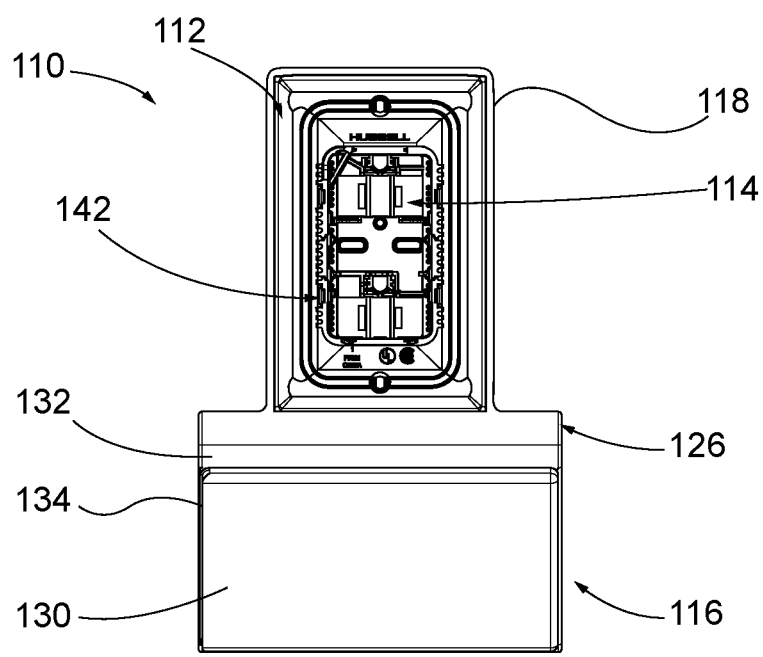
FIG. 11 is a rear view of FIG. 6.
Figure 12:
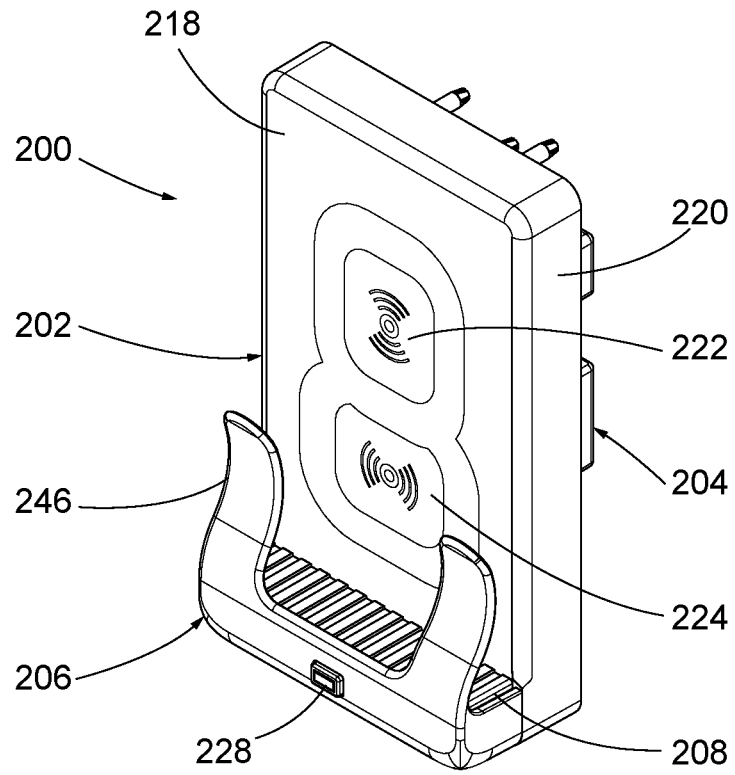
FIG. 12 is a perspective view of an exemplary receptacle inductive charger.
Figure 13:
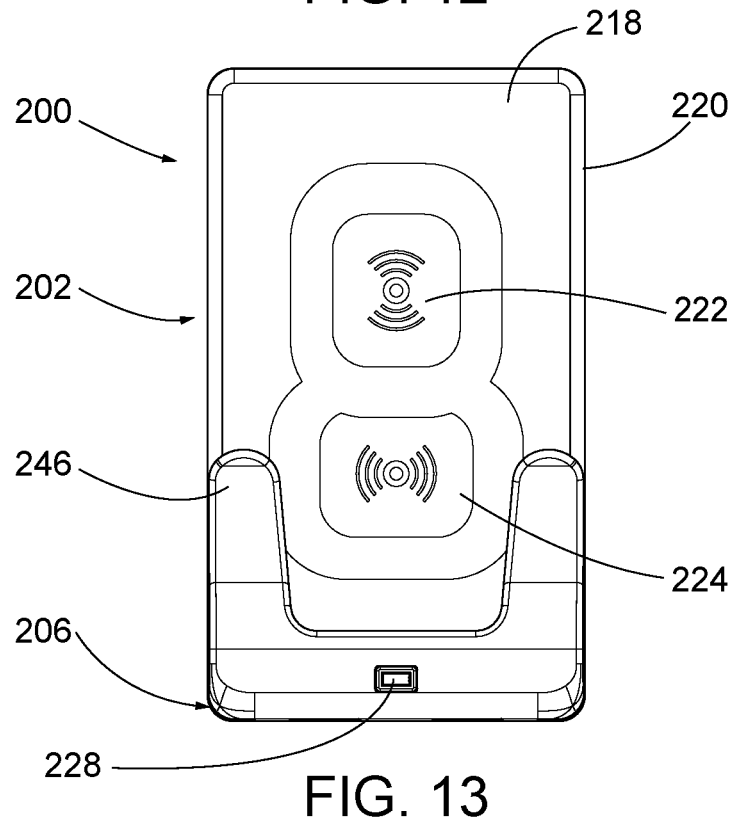
FIG. 13 is a front view of FIG. 12.
Figure 14:
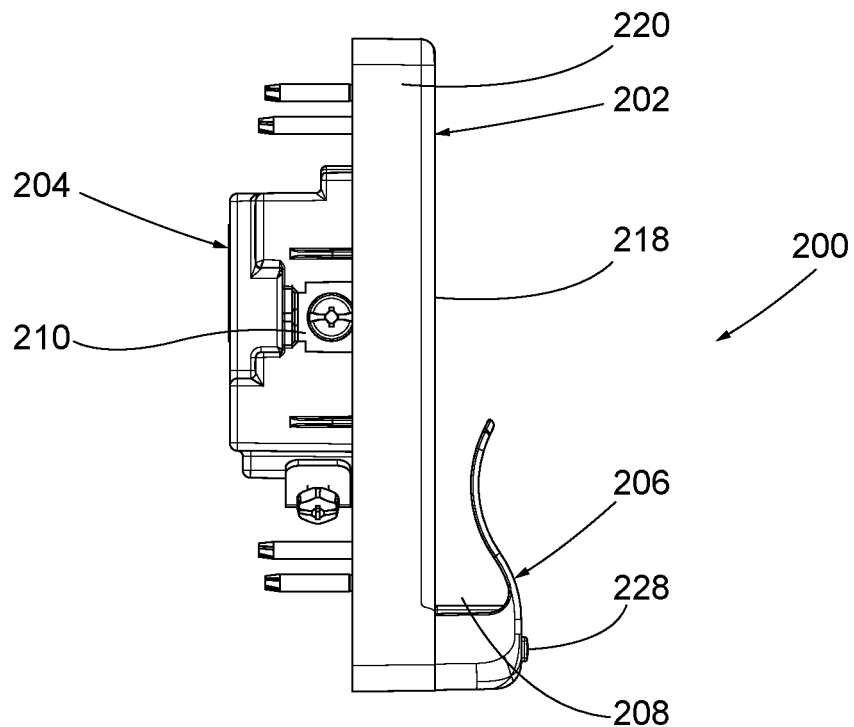
FIG. 14 is a side view of FIG. 12.
Figure 15:
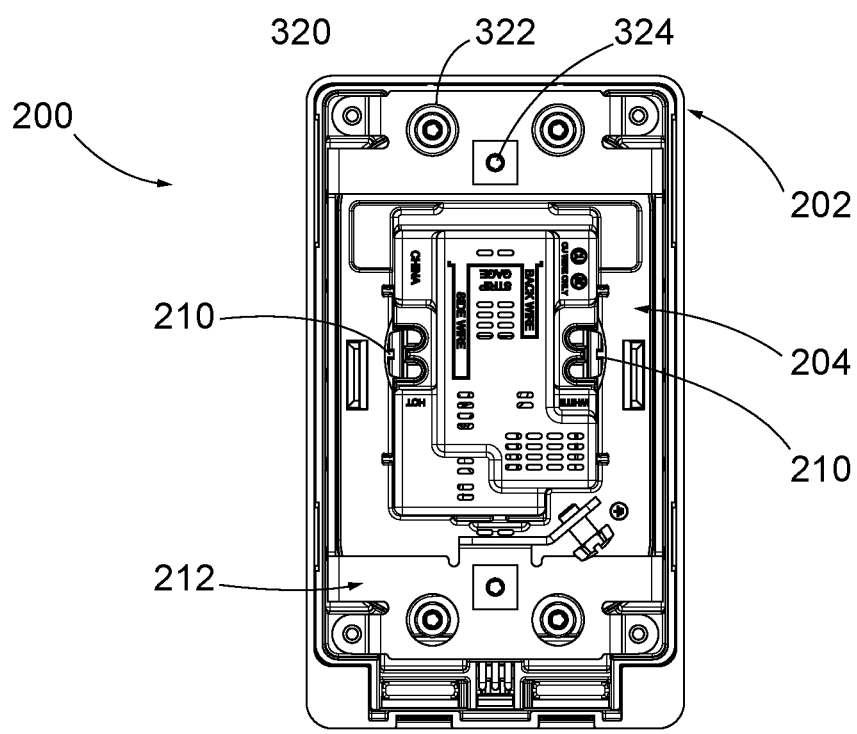
FIG. 15 is a rear view of FIG. 12.

The charging portion 128 is configured to provide wireless, inductive charging to an electronic device. One or more inductive coils (not shown) can be positioned inside of the charging housing 130. The inductive coils are electrically connected to a mains power supply to provide charging to an electronic device. For example, the inductive coils can be powered by one or more conductors that extend through the support member and to a contact or other electrical connection in the receptacle portion 114. In this way, the combination outlet and inductive charger can be easily retrofit to an existing outlet housing. FIGS. 10 and 11 best show the back of the receptacle portion which can include snap-fit connections 142 for attaching the combination outlet and inductive charger to a rear outlet housing.

FIGS. 12-15 show another exemplary embodiment of an inductive charger 200 that is configured to connect to a standard one-gang receptacle opening. The charger 200 includes a faceplate 202 that is connected to a base 204. A device support 206 extends from the faceplate 202 to receive an electronic device for charging. The device support 206 can include a pad 208 to provide increased friction and/or a cushioned surface for the electronic device. The base 204 includes a pair of side terminal connections 210 for receiving power supply conductors. The base 204 is connected to a mounting bracket 212 that can be connected to an outlet housing or junction box. A charger assembly 214 and a set of electrical components 216 are positioned between the faceplate 202 and the base 204 to provide inductive charging to an electronic device.

Figure 16:
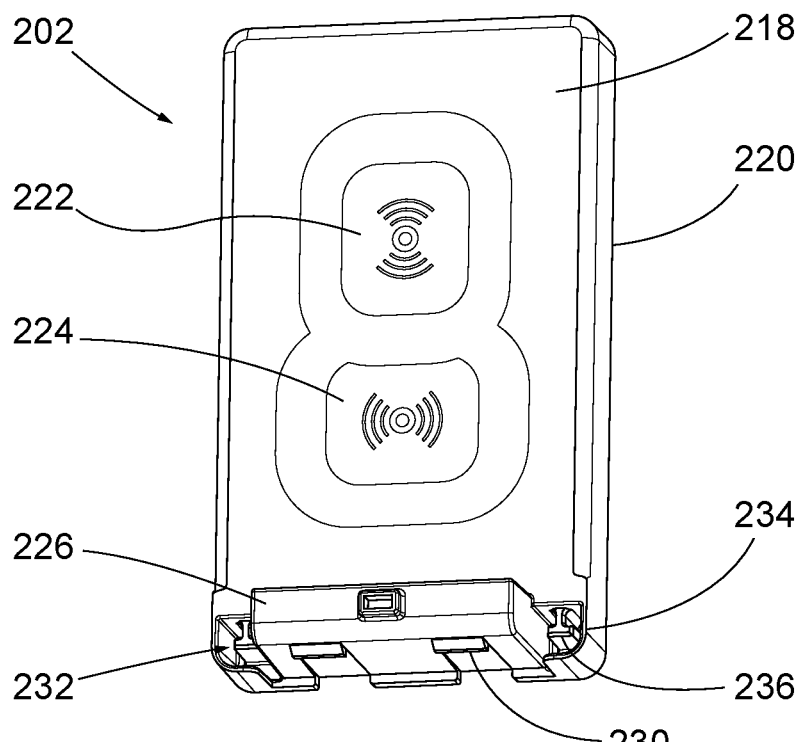
FIG. 16 is a front perspective view of an exemplary faceplate.
Figure 17:
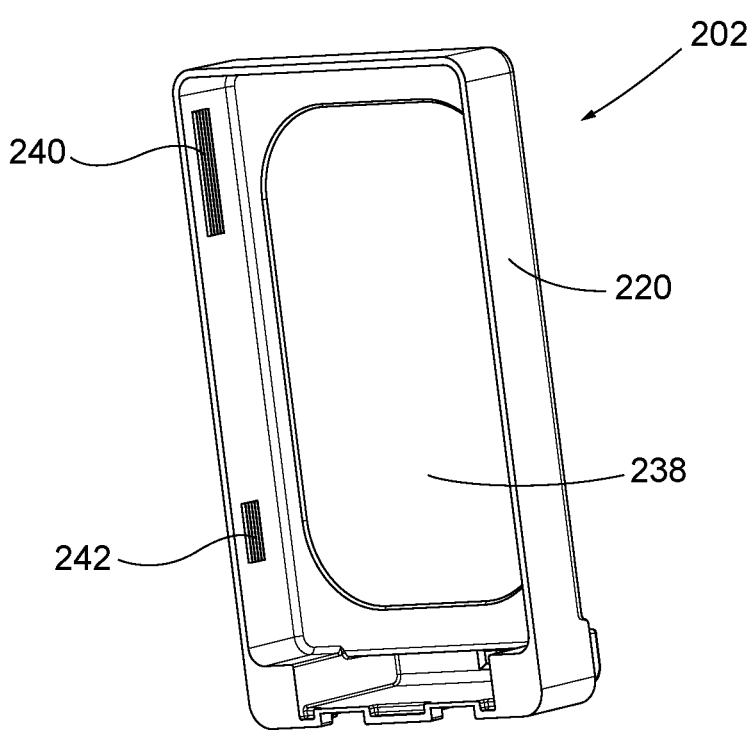
FIG. 17 is a rear perspective view of FIG. 17.

FIGS. 16 and 17 show an exemplary embodiment of the faceplate 202 that includes a front wall 218 and an outer edge 220 that define an interior. The front wall 218 includes an upper section having a charging region with a first charging portion 222 and a second charging portion 224. The first and second charging portions 222, 224 can accommodate different devices and devices in different orientations. For example, the first charging portion 222 can charge a phone in a vertical, or portrait, orientation and the second charging portion 224 can charge a phone in a horizontal, or landscape, orientation.

The lower section of the faceplate includes a ledge 226 extending outwardly from the charging region. The ledge 226 includes an aperture for receiving an indicator light 228, for example and LED. The bottom of the ledge 226 includes a snap-fit connection feature, for example first and second protrusions 230 having a ramped surface. A side pocket 232 is positioned on both sides of the ledge 226. The side pockets 232 include an outer flange 234 extending around a depression. An inverted T-shaped protrusion 236 extends through the side pockets 232. The T-shaped protrusion 236 defines a first channel and a second channel on respective sides of the protrusion 236.

FIG. 17 shows the interior compartment of the faceplate 202 which includes a depression 238 for receiving the charger assembly 214. A set of upper ribs 240 and a set of lower ribs 242 extend from the outer edge 220 on each side of the faceplate 292 into the interior compartment. Grooves are defined between each of the ribs 240, 242. The ribs 240, 242 are used to adjustably connect the faceplate 202 to the base 204.

Figure 18:
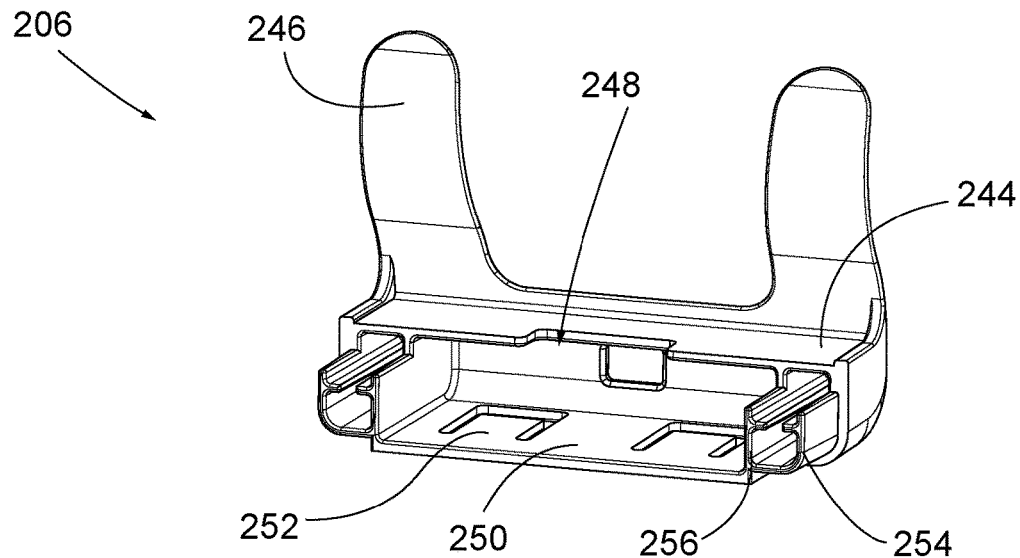
FIG. 18 is a rear perspective view of an exemplary device support.

FIG. 18 shows an exemplary embodiment of the device support 206 having an outer ledge 244 for supporting an electronic device. One or more prongs 246, for example first and second prongs 246 extend up from the sides of the outer ledge 244. Although shown as split prongs 246, a single prong or more than two prongs can be used. The prongs 246 curve toward the faceplate 202 and can be resilient to accommodate devices of different thicknesses. The device support 206 includes a central region 248 having an opening receiving the indicator light 228. A bottom wall 250 of the central region includes a snap fit connector for connecting the device support 206 to the faceplate 202. For example, a set of flexible tabs 252 are provide to mate with the ramped projections 230 on the faceplate 202. When making the connection, the tabs 252 will deflect as they slide over the ramped projections 230 which are received in openings in front of the tabs 252. A side track is positioned on both sides of the central region 248. The side tracks include an outer rim 254 and a pair of rails 256. A groove is defined between the rails 256 for receiving the T-shaped protrusion 236 of the faceplate 202.

Figure 19:
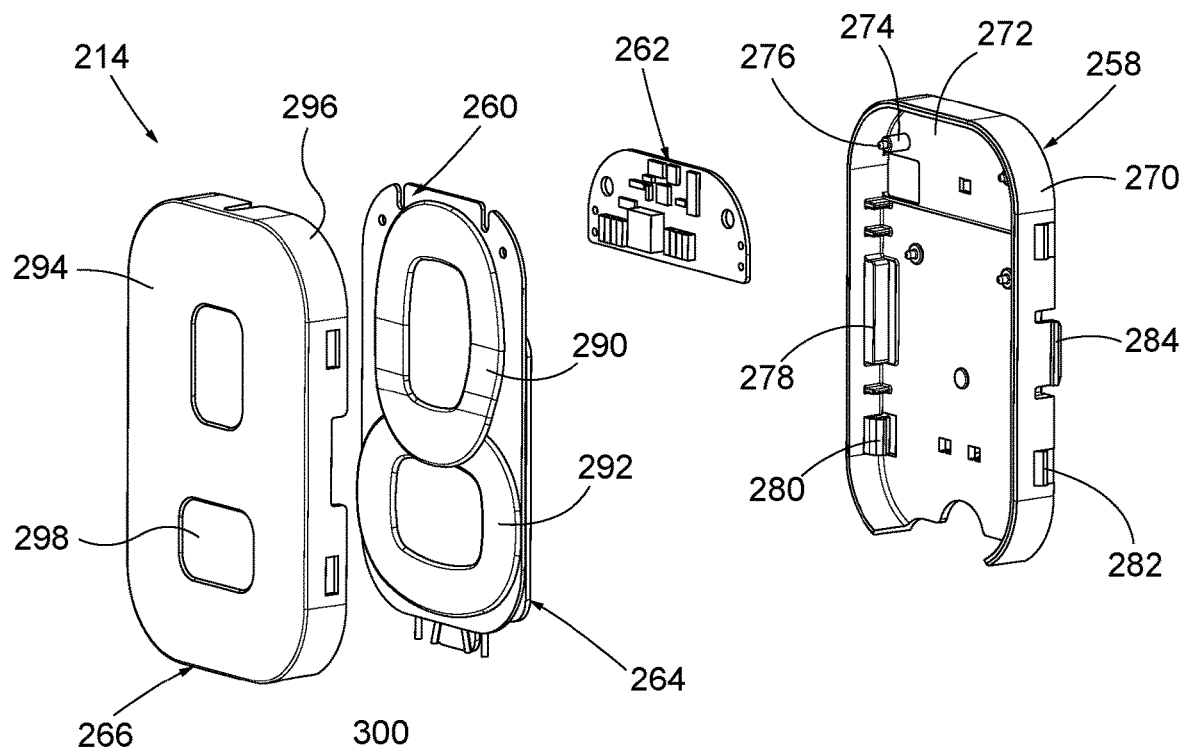
FIG. 19 is an exploded view of an exemplary charger assembly.
Figure 20:
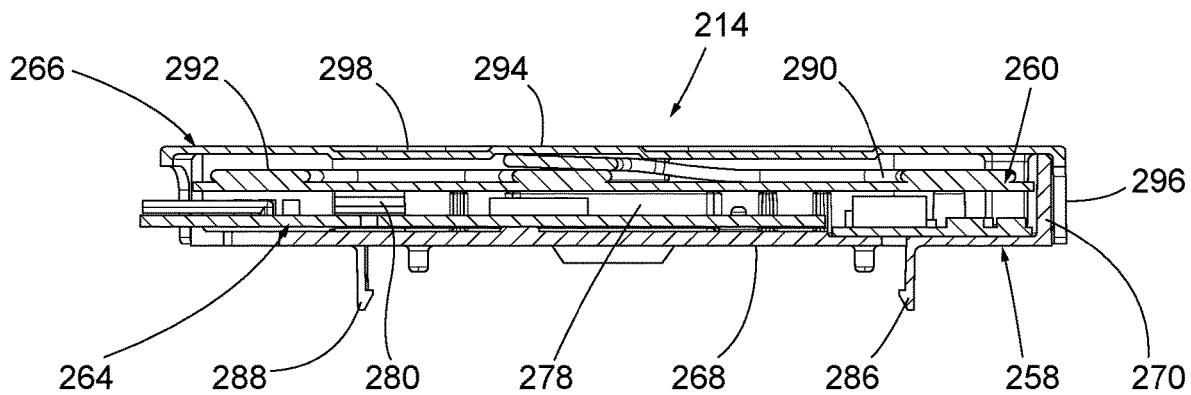
FIG. 20 is a side, sectional view of the assembled charger assembly of FIG. 19.
Figure 21:
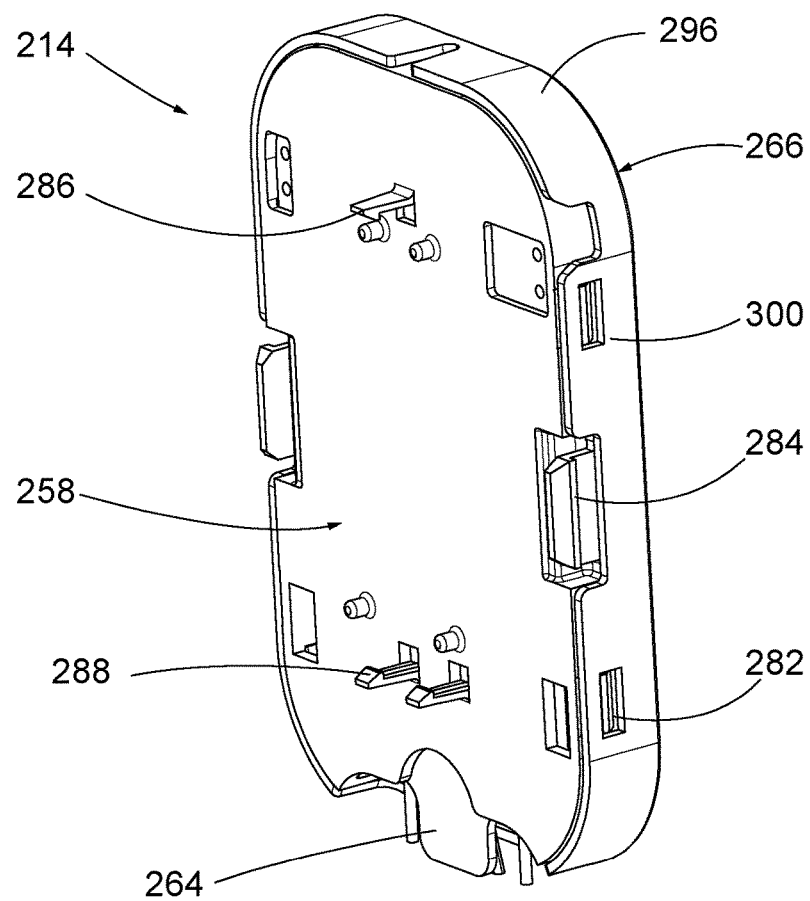
FIG. 21 is a rear perspective view of FIG. 20.

FIGS. 19-21 show an exemplary embodiment of the charger assembly 214 that includes a rear cover 258, a charging pad 260, an upper circuit board 262, a lower circuit board 264, and a front cover 266. The upper and lower circuit boards 262, 264 are configured to control the power through the charging pad 260. The front cover 266 and rear cover 258 are connected together and define a chamber for receiving the charging pad 260 and the upper and lower circuit boards 262, 264. When assembled together, the charger assembly 214 is received in the base 204.

The rear cover 258 includes a rear wall 268 and an outer wall 270 that define an interior. A depression 272 is provided in an upper section of the rear wall 268 for receiving the upper board 262. A pair of bosses 274 extend from the rear wall 268 and the upper board 262 is provided with openings corresponding to the bosses 274. The bosses 274 include an upper knub 276. A support 278 extends from the interior of the outer wall 270 on each side of the rear cover 258 to hold the charging pad 260. A hook 280 extends from the interior of the outer wall 270 on each side of the rear cover 258 to support the lower board 264.

The exterior of the outer wall 270 includes a first snap-fit connector for connecting to the front cover 266 and a second snap-fit connector for connecting to the base 204. The first snap-fit connector includes an upper and lower ramped protrusion 282. The second snap-fit connector includes a deflectable arm with a hooked protrusion 284. As best shown in FIG. 21, the exterior of the rear wall 268 includes snap-fit connectors including an upper hook 286 and a pair of lower hooks 288.

The charging pad 260 includes a first charging coil 290 and a second charging coil 292. The first and second charging coils 290, 292 correspond to the first and second charging portions 222, 224 of the faceplate 202 to accommodate different devices and devices in different orientations. A pair of opening 294 are provided in the upper portion of the charging pad 260 that receive the knubs 276 from the rear cover 258.

The front cover 266 includes a front wall 294 and an outer edge 296 extending from the front wall 294. Indentions 298 are provided in the front wall 294 that align with the centers of the charging coils 290, 292. A snap-fit connector is provided on the outer edge 296 for connecting the front cover 266 to the rear cover 258. The connector includes upper and lower slots 300 that receive the ramped protrusions 282 from the rear cover 258.

Figure 22:
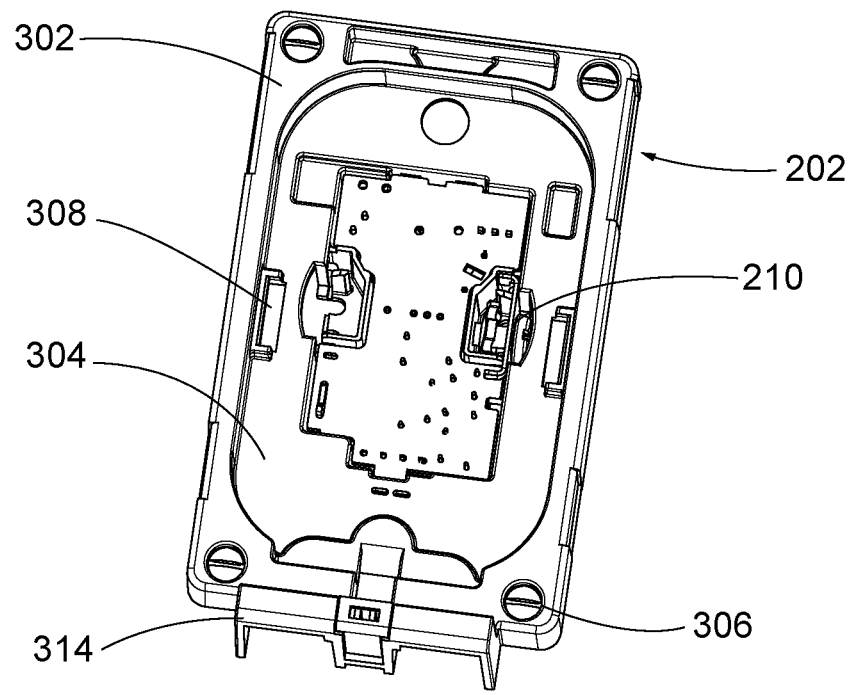
FIG. 22 is a front perspective view of an exemplary base and a set of electrical components received therein.
Figure 23:
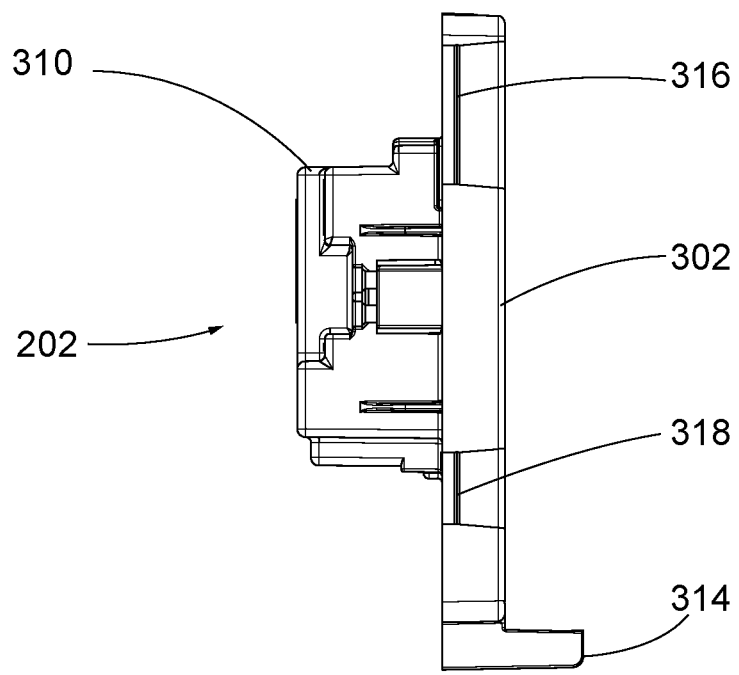
FIG. 23 is a side view of FIG. 22.
Figure 24:
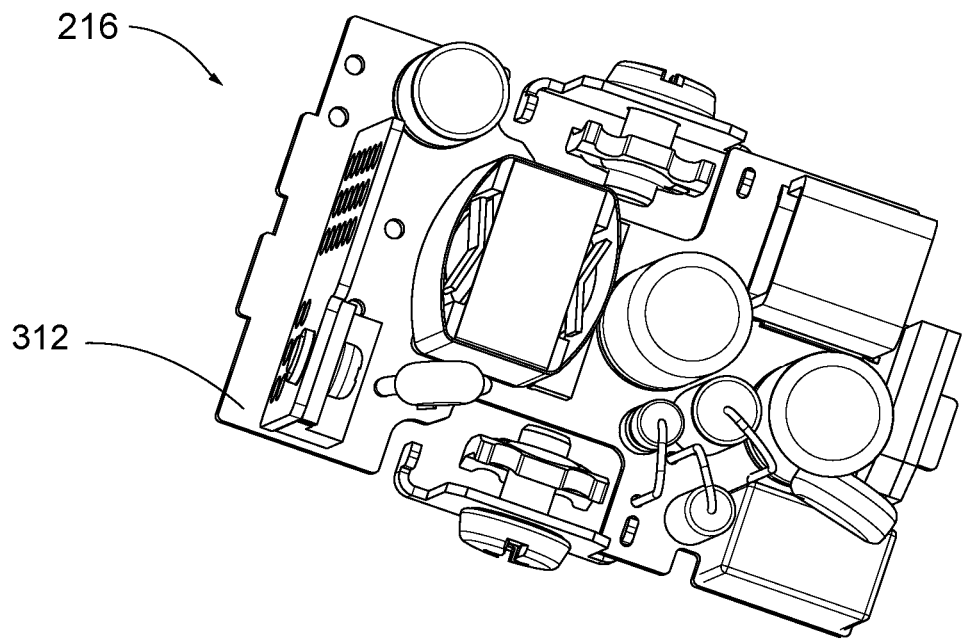
FIG. 24 is a rear perspective view of an exemplary set of electrical components.

FIGS. 22 and 23 show an exemplary embodiment of the base 204 that includes a raised outer edge 302 surrounding a rear wall 304. The outer edge 302 includes corner openings 306 that are configured to receive fasteners to connect the base 304 to the mounting bracket 212. The rear wall 304 is configured to receive the charger assembly 214. A pair of slots 308 are provided in the rear wall 304 to receive the deflectable arm 284 of the rear cover 258. A chamber 310 is provided in the rear wall 304 for receiving the component assembly 216, including a component board 312 and a number of electrical components connected to the board 312 (FIG. 24). The components are configured to convert the power supply received by the terminals 210.

The base 204 is configured to mate with the faceplate 202. As best shown in FIG. 23, a lower portion 314 extends from the rear wall 304 to engage the ledge 226 of the faceplate 202. The sides of the base 304 include an upper protrusion 316 and a lower protrusion 318. In an exemplary embodiment the protrusions 316, 318 are tapered as they extend outwardly from the side edge, having a base and a point that gives them a substantially triangular cross-section, although other shapes can be used. When the faceplate 202 is connected to the base 204, the ribs 240, 242 on the interior of the faceplate 202 will slide over the respective protrusion 316, 318 so that the protrusions 316, 318 will mate with the grooves defined between the ribs 240, 242. In this way, the position of the faceplate 202 is adjustable relative to the base 204 so that the faceplate 202 can be positioned flush to a wall.

Figure 25:
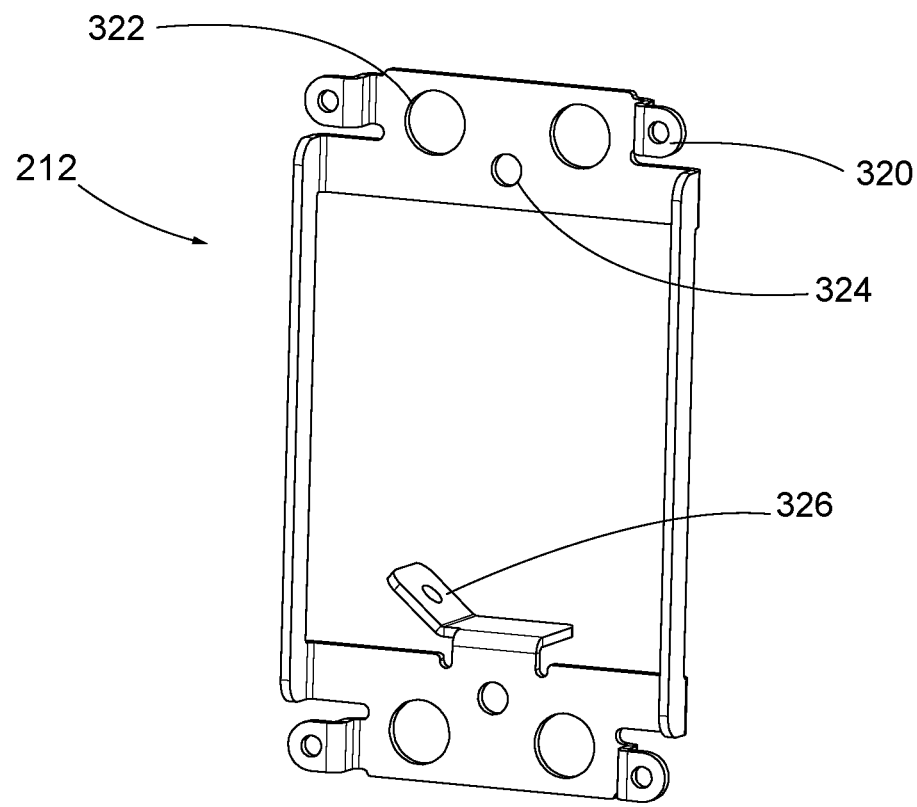
FIG. 25 is a front perspective view of an exemplary mounting bracket.

FIG. 25 shows an exemplary embodiment of the mounting bracket 212. The mounting bracket 212 includes corner flanges 320 that receive fasteners connected to the base 204. The mounting bracket 212 includes a first set of openings 322 and a second set of openings 324 to connect to a junction box or outlet housing. A ground tab 326 allows the mounting bracket 212 to be connected to a ground wire.

Figure 26:
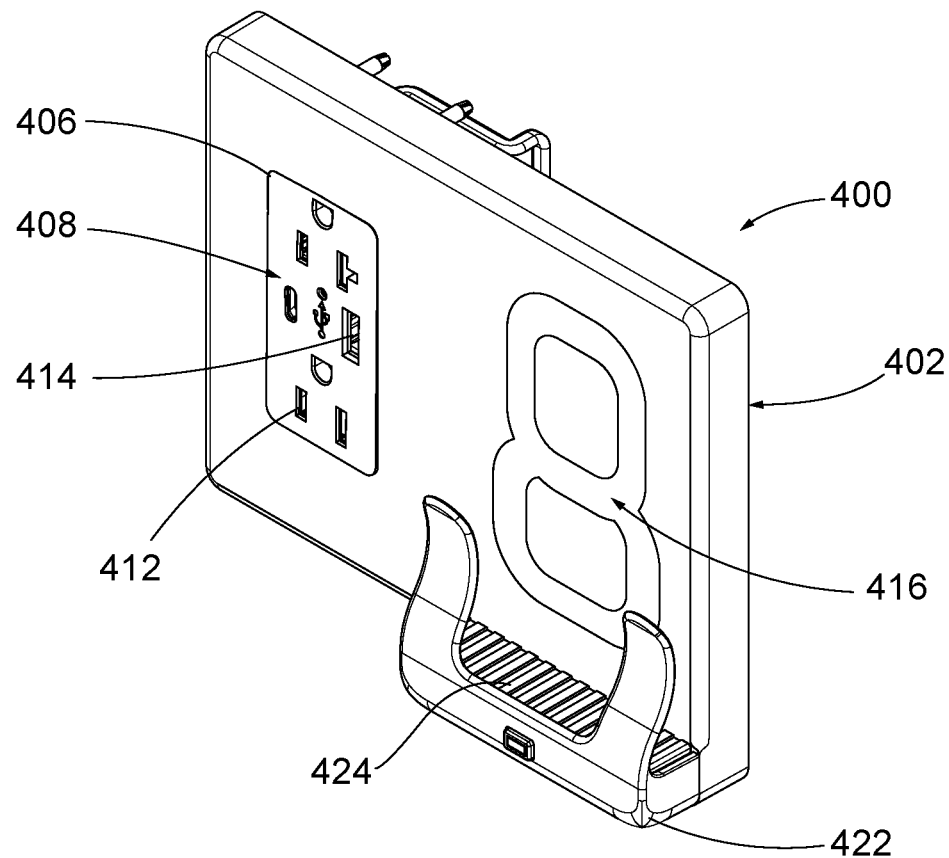
FIG. 26 is front perspective view of an exemplary 2-gang charger and outlet.
Figure 27:
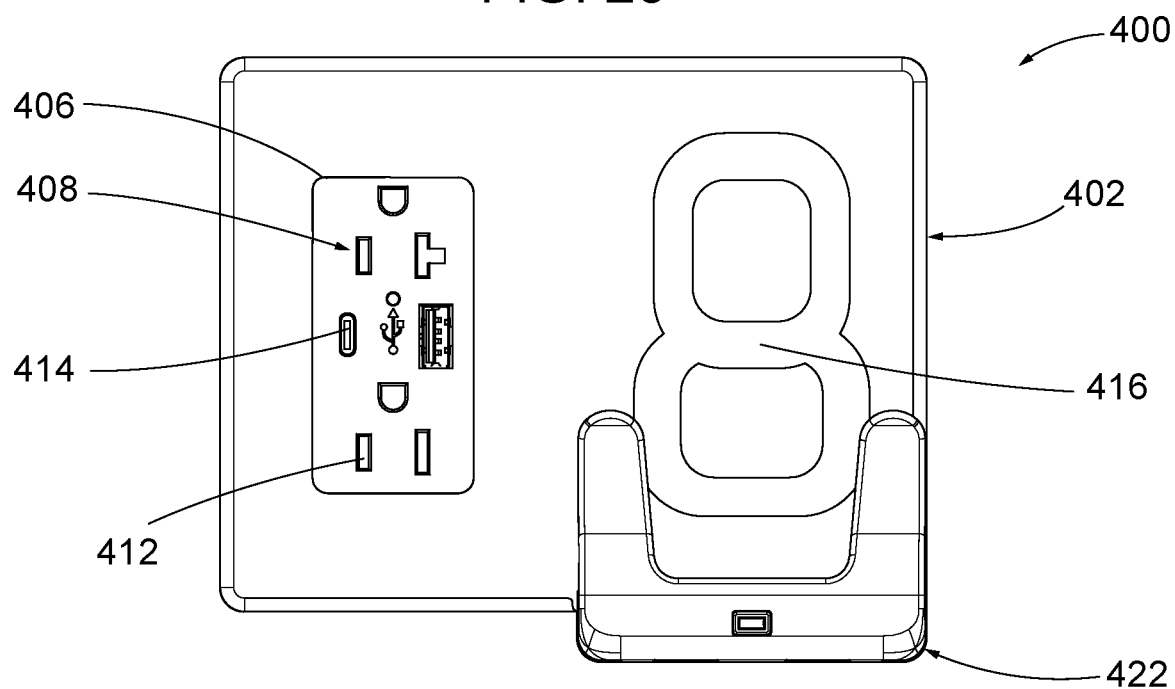
FIG. 27 is a front view of FIG. 26.
Figure 28:
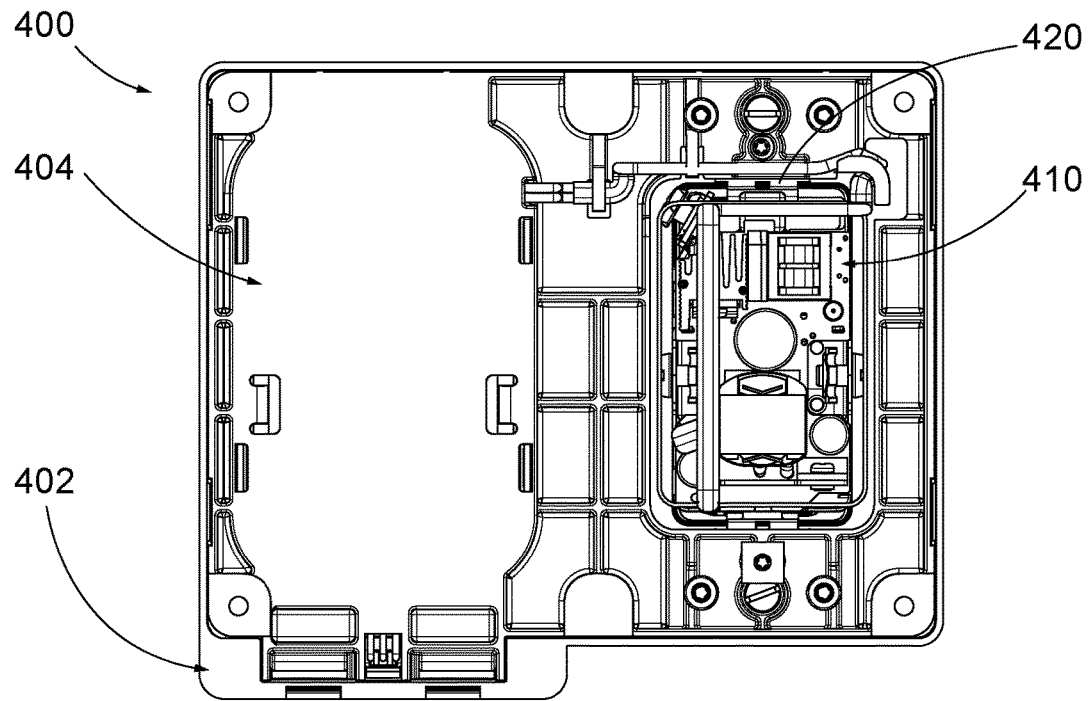
FIG. 28 is a rear view of FIG. 26.

FIGS. 26-28 show an exemplary embodiment of a two-gang charger 400 configuration with a receptacle portion and an inductive charger portion. The two-gang charger 400 includes a faceplate 402 that is connected to a base 404. A first side of the faceplate 402 includes a receptacle opening 406 providing access to an electrical outlet 408. The base 404 is configured to receive the outlet 408 and a set of electrical components 410, and is configured to connect to an outlet housing or junction box. Although the charger 400 is a two-gang assembly, it is configured to connect to a standard one-gang outlet housing. The outlet 408 includes a pair of three-prong outlets 412 and a pair of USB outlets 414. Different outlet configurations can also be used, including two prong outlets or only USB outlets.

A second side of the faceplate 402 includes an inductive charging portion 416, and a charger assembly 418 is positioned between the faceplate 402 and the base 404 to provide inductive charging to an electronic device. One or more conductors 420 extend from the outlet portion to the charger assembly 418 to provide power to the inductive charger. A device support 422 extends from the faceplate 402 to receive an electronic device for charging. The device support 422 can include a pad 424 to provide increased friction and/or a cushioned surface for the electronic device.

Figure 29:
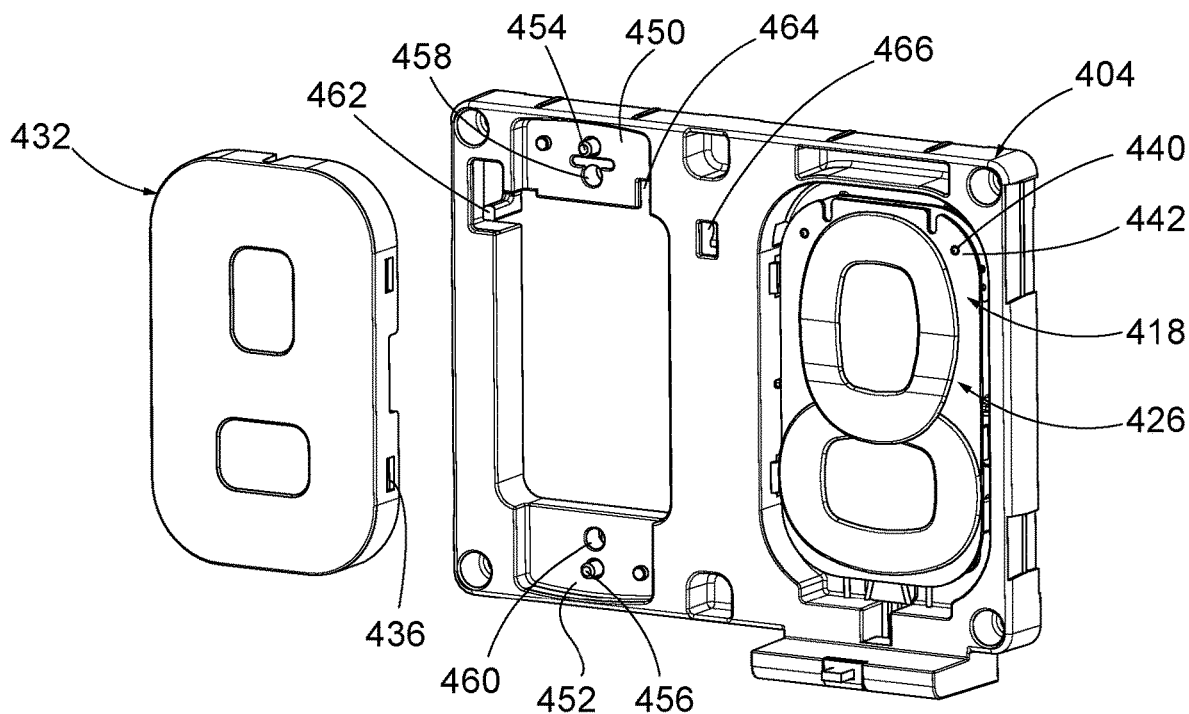
FIG. 29 is a partially exploded, front perspective view of the base and the charger assembly.
Figure 30:
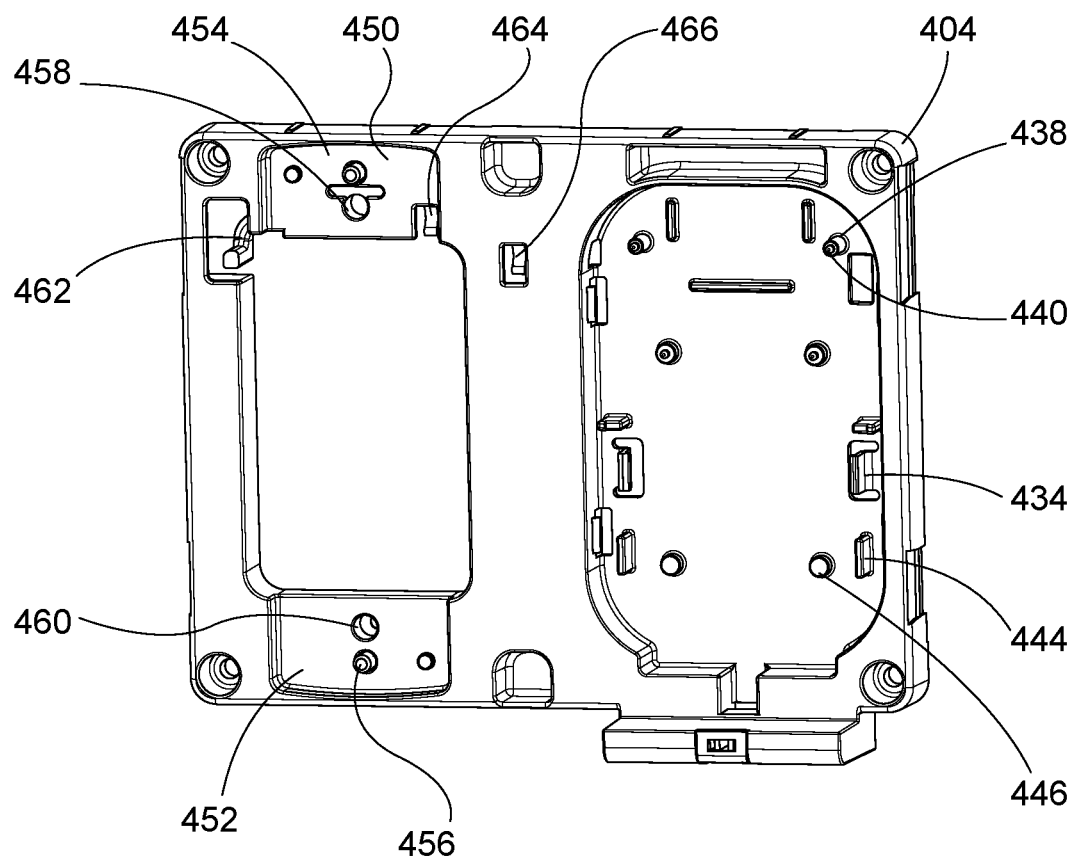
FIG. 30 is a front perspective view of the base of FIG. 26.

The features of the two-gang charger 400 are substantially the same as those described above for the one-gang charger 200. As shown in FIGS. 29 and 30, the charger assembly 418 does not include a rear cover and instead the charging pad 426, circuit boards, and front cover 432 are received directly by the base 404. The base 404 includes a set of snap-fit projections, for example deflectable hooks 434 that are configured to connect to the slots 436 in the front cover 432. A pair of bosses 438 extend from the base 404 and the upper circuit board is provided with openings corresponding to the bosses 438. The bosses 438 include an upper knub 440. The knubs 440 are used to engage openings 442 on the charging pad 426. Side projections 444 are used to center the charging pad 426 and the lower circuit board and various internal projections 446 are used to space the charger assembly 418 components above the rear wall of the base 404.

As best shown in FIG. 30, the outlet portion of the base 404 includes an upper depression 450 and a lower depression 452 for receiving a standard outlet mounting strap. An upper boss 454 and a lower boss 456 engage openings in the mounting strap and upper apertures 458 and lower apertures 460 receive fasteners to secure the outlet to the base 404. The outlet portion includes one or more cable management components to position the conductor extending between the outlet portion and the charging portion. The cable management components can include an arm 462 and a first hook 464 positioned in the outlet portion and a second hook 466 positioned between the outlet portion and the charging portion.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A wall outlet inductive charger comprising:
   a base connected to a set of terminals for receiving power supply conductors;
   a faceplate connected to the base, the faceplate including a charging portion;
   a device support extending from the faceplate;
   a charger housing connected to the base and positioned between the base and the faceplate; and
   a charging pad including an inductive coil positioned in the charger housing.

2. The wall outlet inductive charger of claim 1, wherein the device support includes a ledge and a resilient prong extending from the ledge.

3. The wall outlet inductive charger of claim 2, wherein the device support includes a friction pad connected to the ledge.

4. The wall outlet inductive charger of claim 1, wherein the charger housing includes a front cover snap-fit to the base.

5. The wall outlet inductive charger of claim 1, wherein the charger housing includes a front cover and a rear cover, and wherein the rear cover is snap-fit to the base.

6. The wall outlet inductive charger of claim 1, wherein the base and the faceplate includes a receptacle opening.

7. The wall outlet inductive charger of claim 6, wherein the base includes an upper depression and a lower depression configured to receive an outlet mounting strap.

8. The wall outlet inductive charger of claim 1, wherein the base includes a chamber receiving a circuit board and a set of electrical components.

9. The wall outlet inductive charger of claim 1, wherein the faceplate is adjustably connected to the base.

10. A wall outlet inductive charger comprising:
    a mounting bracket configured to connect to an outlet housing;
    a base connected to the mounting bracket and to a set of terminals for receiving power supply conductors;
    a faceplate connected to the base, the faceplate including a charging portion;
    a device support connected to the faceplate;
    a charger housing connected to the base and positioned between the base and the faceplate; and
    a charging pad including an inductive coil positioned in the charger housing.

11. The wall outlet inductive charger of claim 10, wherein the device support includes a set of flexible tabs configured to snap-fit to the faceplate.

12. The wall outlet inductive charger of claim 10, wherein the charger housing includes a front cover snap-fit to a rear cover.

13. The wall outlet inductive charger of claim 12, wherein the rear cover is snap-fit to the base.

14. The wall outlet inductive charger of claim 10, wherein the faceplate includes an interior surface and a set of ribs extending from the interior surface, and wherein the base includes a protrusion positioned to engage the ribs when the faceplate is connected to the base.

15. The wall outlet inductive charger of claim 10, further comprising an indicator light positioned in the device support.

16. A wall outlet inductive charger comprising:
    a base configured to connect to an outlet housing and a set of terminals for receiving power supply conductors, wherein the base includes a receptacle receiving portion and an inductive charger portion;
    a faceplate connected to the base, the faceplate including a charging portion and a receptacle opening;
    a device support connected to the faceplate;
    a charger housing connected to the base and positioned between the base and the faceplate; and
    a charging pad including an inductive coil positioned in the charger housing.

17. The wall outlet inductive charger of claim 16, wherein the charger housing includes a front cover snap-fit to the base.

18. The wall outlet inductive charger of claim 16, wherein a conductor extends from the receptacle receiving portion to the charger housing.

19. The wall outlet inductive charger of claim 18, wherein the base includes an arm receiving the conductor.

20. The wall outlet inductive charger of claim 16, wherein the base includes an upper depression and a lower depression configured to receive an outlet mounting strap.

* * * * *